Oct. 6, 1953 J. H. PFAU 2,654,246
FLOWMETER
Filed May 9, 1950

INVENTOR.
JULIUS H. PFAU
BY
ATTORNEY

Patented Oct. 6, 1953

2,654,246

UNITED STATES PATENT OFFICE 2,654,246

FLOWMETER

Julius H. Pfau, Yonkers, N. Y., assignor to Alexander Smith, Incorporated, a corporation of New York Application May 9, 1950, Serial No. 160,977

5 Claims. (Cl. 73—217)

1

This invention relates to an apparatus for measuring rates of flow of a pourable material such as a liquid or a divided solid, and more particularly to an apparatus for measuring the flow of material such as stock wool to a processing tank.

An object of the invention is to provide a flow meter of the above type which is accurate within known limits for a given range of flow rates.

Another object is to provide an apparatus of the above type which is simple and dependable in operation and can be readily calibrated for a given working range.

Another object is to provide an apparatus of the above type which is not affected by accumulated dirt or grease such as that derived from commercial stock wool.

Another object is to provide a simple and dependable device for measuring the rate of flow, the total flow over a given time period, and the portion of such period when flow is interrupted.

Various other objects and advantages will be apparent as the nature of the invention is more fully disclosed.

Figure 1:
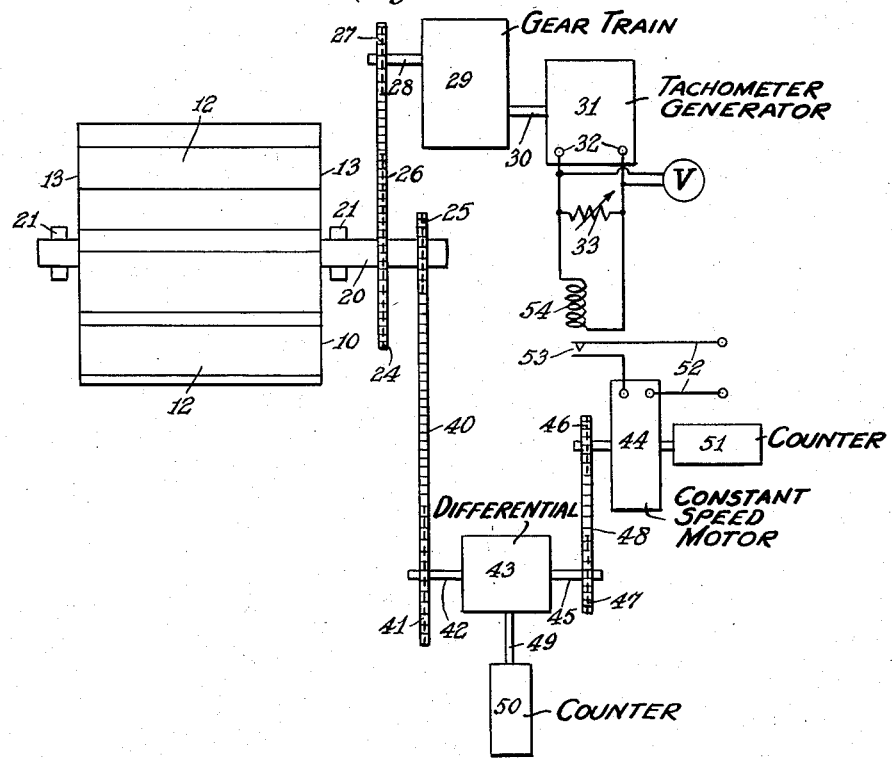
Figure 2:
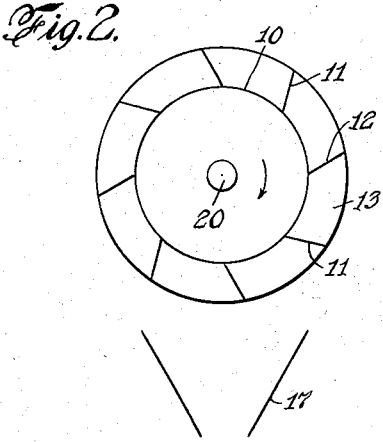

The nature of the invention will be better understood by referring to the following description taken in connection with the accompanying drawings in which:

Fig. 1 is a diagrammatic view of a weighing device illustrating one embodiment of the invention; and Fig. 2 is a transverse section through the bucket wheel forming a part of the weighing device.

Referring to the drawings more in detail, the bucket wheel is shown as comprising a drum 10 carrying around its periphery a plurality of longitudinal inclined vanes 11 forming therebetween buckets 12 which are closed by end flanges 13. The material is supplied to the bucket wheel by a hopper 14 having a bottom opening 15 and an inclined guide plate 16 which guides the material into the buckets at a point near the center line of the wheel so as to eliminate as far as possible the effect of the impact of the material on the wheel. After passing around a portion of the periphery of the wheel the material is discharged from the buckets into a hopper 17 or the like.

The bucket wheel is supported on a shaft 20 which is journalled in frictionless bearings 21 supplied with the usual lubricating devices, such as drip oilers, to maintain constant conditions. The shaft 20 carries a pair of sprockets 24 and 25. A chain 26 which is driven by the sprocket 24 drives a gear 27 on a shaft 28 of an increasing gear train indicated by gear box 29. The output shaft 30 of this increasing gear train drives a tachometer generator 31 of the type which produces an output voltage at terminals 32 proportional to the rate of rotation of the generator. A variable load resistor 33 is connected across the output terminals 32 and is adjusted to determine the load on the generator and consequently the load driven by the bucket wheel.

The sprocket 25 drives chain 40 which, through a gear 41, drives an input shaft 42 of a differential mechanism 43. A constant speed motor 44 drives a shaft 45 constituting the other input of the differential mechanism 43 through gears 46 and 47 and chain 48. The differential cage drives an output shaft 49 which is connected to a suitable counter 50 which, as hereinafter described integrates the total weight of material passing the bucket wheel. The constant speed motor 44 is connected to drive a counter 51. The motor 44 is energized from a line 52 through a switch 53 which is controlled by a relay coil 54 connected to the output terminal 32 of the tachometer generator 31.

In the operation of this device the material to be weighed, such as stock wool, is fed from the hopper 14 onto the bucket wheel and is deposited in the buckets 12 on the wheel. The weight of the material causes the wheel to rotate at a speed which is determined by the weight of the material on the wheel at any given instant.

It has been found that the weight of material required to cause one complete revolution of the wheel increases with the rate of rotation because of increased resistance to rotation at higher rates. As a specific example, one and one-half pounds of material applied at the rate of 15 pounds per minute may be required to cause one revolution of the wheel at 10 R. P. M., whereas two pounds of material applied at the rate of 20 pounds per minute may be required to cause one revolution of the wheel at 20 R. P. M. Under these conditions 15 pounds of material fed at the rate of fifteen pounds per minute will cause the wheel to make 10 revolutions in one minute; whereas 40 pounds of material fed at the rate of 40 pounds per minute are required to cause the wheel to make 20 revolutions in one minute. Hence, if the counter 50 were operated directly from the shaft 20, it would only be accurate for one specific speed of rotation of the wheel.

In order to avoid this difficulty, the counter 50 is connected to a differential 43 as above described, the second input side of which is driven in a reverse direction at a constant speed by a constant speed motor 44. Hence the counter 50 represents the turns of the wheel introduced through the shaft 42 minus the turns of the timing motor 44 introduced by the shaft 45.

The calibration and operation of the device can best be understood from a specific example. The load on the wheel produced by adjustment of the load resistor 33 of the tachometer generator may be assumed to be so set that one and one-half pounds of material produces one revolution of the wheel at a rate of 10 R. P. M. and 2 pounds of material produces one revolution of the wheel at a rate of 20 R. P. M. as above described. Under these conditions the counter 50 is so geared to the shaft 20 as to indicate two and one-half pounds of material for each revolution of the wheel with the shaft 45 of the differential 43 held stationary, and the timing motor 44 is operated at a constant speed adapted to subtract ten pounds per minute from the indication of the counter 50.

Under these conditions with the bucket wheel rotating at 10 R. P. M. the gears 25 and 41 and chain 40 would cause the counter 50 to register 25 pounds after 10 revolutions of the bucket wheel. However, during this period of time the timing motor 44 subtracts 10 pounds from the registration of the counter 50, leaving a total of 15 pounds as the indication registered by such counter, which under the conditions assumed above is a correct indication of the weight of material which has passed over the bucket wheel in one minute.

Assuming now that the rate of flow is increased so that the bucket wheel is caused to rotate at 20 R. P. M. this would set into the counter 50 an indication of 50 pounds of material at the end of the 20 rotations of the bucket wheel. However, during this same period the timing motor 44 operates to subtract 10 pounds from the indication of the counter thereby causing the counter to indicate 40 pounds at the end of the 20 revolutions of the bucket wheel, which, as pointed out above, is the correct weight of the material required to cause the bucket wheel to rotate at 20 R. P. M.

Suitable curves drawn to the above two points and through other points calculated in the same manner show that the reading of the counter 50 is accurate with only a small degree of error over a substantial range of rates of flow and this range may be adjusted to cover the various rates encountered in certain commercial operations.

In order to prevent the timing motor 44 from running the counter 50 backwards when there is no flow, or a limited flow, the switch 53 is provided which is actuated by the relay coil 54 when the voltage developed across the tachometer generator 31 reaches a predetermined value. This value may be selected to correspond to a rate of the bucket wheel which is sufficient to produce a positive indication of the counter 50 when the timing motor is operating and constitutes the minimum rate for which accurate results may be obtained. In the above example this rate would correspond to between 10 and 15 pounds per minute. In practice this represents about the minimum rate of the wheel as a certain weight of material is required to overcome the starting friction and load on the wheel. Hence the counter is seldom required to operate below the minimum range and no substantial error is incurred by this limitation.

The timing motor 44 is thus only operated when the flow exceeds this minimum rate and the counter 51 serves as an indicator of the actual time during which flow occurs. Hence by subtracting the indication of the counter 51 from the elapsed time, it is possible to determine the shutdown periods during which no flow occurred.

Also, since the tachometer generator 31 produces a voltage proportional to the rate of the bucket wheel, a suitably calibrated voltmeter may be connected across the output terminal 32 to serve as an instantaneous indication of the rate of flow.

It is of course understood that the above example is given only as an illustration and that in practice the device will be calibrated by suitable adjustment of the load resistance 33 and of the rate introduced into the differential 43 by the timing motor 44 so as to provide the accuracy required over the particular ranges selected.

The device has been found particularly suitable for measuring the flow of stock wool to a treating tank although by suitable changes in the construction and calibration it may be adapted to the measurement of flow of other materials. Since the balance of the wheel is not affected by accumulation of grease or dirt from the wool, no compensation is necessary and the accuracy is maintained over long periods of use. Obviously the buckets may be mounted on an endless conveyor of other types. A wheel has been shown for illustration only.

What is claimed is:

1. A device for weighing flowable material, comprising an endless conveyor having pockets to receive said material and adapted to be driven by the weight of the material thereon, means feeding said material to said conveyor, a constant speed drive, a counter, a differential having a pair of inputs connected to be driven in opposite directions by said conveyor and by said drive respectively, and having an output connected to drive said counter.

2. A device for weighing flowable material, comprising a wheel having peripheral pockets to receive said material and adapted to be driven by the weight of the material thereon, means feeding said material to said wheel and thereby causing rotation thereof, a constant speed motor, a differential having a pair of input shafts, means connecting one of said input shafts to be driven in one direction by said wheel, means connecting the other of said input shafts to be driven by said motor in a reverse direction, said differential having an output shaft operating at a rate corresponding to the difference between said input rates and a counter connected to be actuated by said output shaft.

3. A device for weighing flowable material, comprising a wheel having peripheral pockets to receive said material and adapted to be driven by the weight of the material thereon, means feeding said material to said wheel and thereby causing rotation thereof, a constant speed motor, a differential having a pair of input shafts, means connecting one of said input shafts to be driven in one direction by said wheel, means connecting the other of said input shafts to be driven by said motor in a reverse direction, said differential having an output shaft operating at a rate corresponding to the difference between said input rates and a counter connected to be actuated by said output shaft, and means responsive to the rate of rotation of said wheel connected to interrupt the operation of said constant speed motor when the rate of said wheel falls below a predetermined minimum.

4. A device for the continuous weighing of a flowable material, comprising a bucket wheel having peripherally disposed buckets to receive said material and adapted to be driven by the weight of said material, means supplying said material to said buckets for driving said wheel, a tachometer generator connected to be driven by said wheel and having means producing an output voltage which is a function of the rate of rotation of said wheel, a relay connected to said generator and adapted to be actuated by the output voltage thereof, a constant speed motor having an energizing circuit connected to be closed by said relay when said output voltage exceeds a predetermined value, a differential having a pair of input shafts connected to be driven respectively and in opposite directions by said bucket wheel and by said constant speed motor and having an output shaft representing the differential effect of said input shafts and a counter mechanism connected to be actuated by said output shaft.

5. A device for weighing flowable material, comprising an endless conveyor having pockets to receive said material and adapted to be driven by the weight of the material thereon, means feeding said material to said conveyor, a constant speed drive, a counter, and differential means connecting said conveyor to drive said counter to indicate the extent of travel thereof and connecting said constant speed drive to drive said counter in the reverse direction.

JULIUS H. PFAU.

References Cited in the file of this patent

UNITED STATES PATENTS

| Number | Name | Date |
|---|---|---|
| 68,472 | Walker | Sept. 3, 1867 |
| 2,147,344 | Horner | Feb. 14, 1939 |
| 2,221,943 | Fischer | Nov. 19, 1940 |

FOREIGN PATENTS

| Number | Country | Date |
|---|---|---|
| 367,149 | Great Britain | Feb. 18, 1932 |